(No Model.) 2 Sheets—Sheet 1.
O. A. BELL.
METHOD OF AND APPARATUS FOR DETERMINING RANGES AND DISTANCES.
No. 558,926. Patented Apr. 28, 1896.
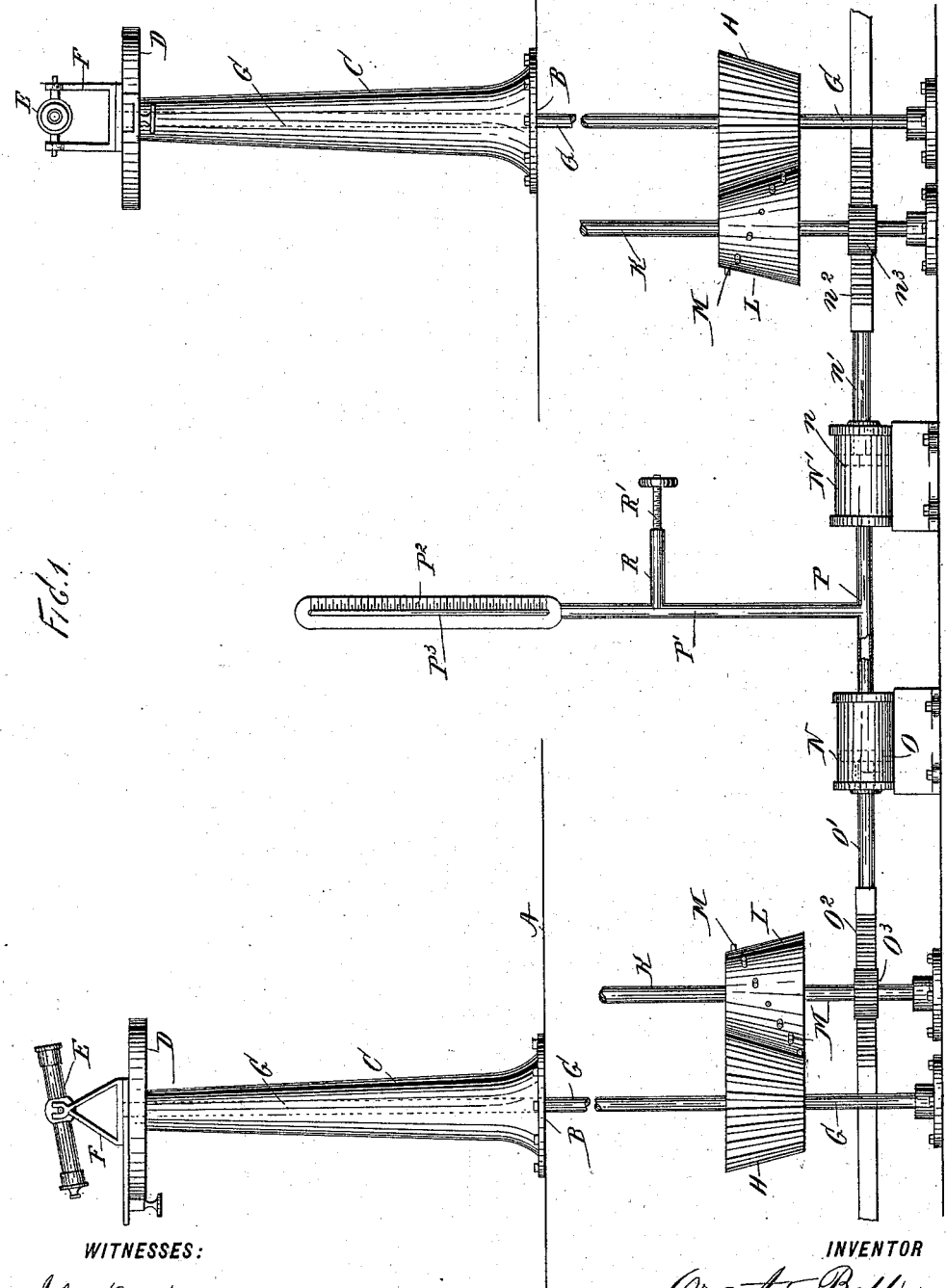

(No Model.) 2 Sheets—Sheet 2.
O. A. BELL.
METHOD OF AND APPARATUS FOR DETERMINING RANGES AND DISTANCES.
No. 558,926. Patented Apr. 28, 1896.
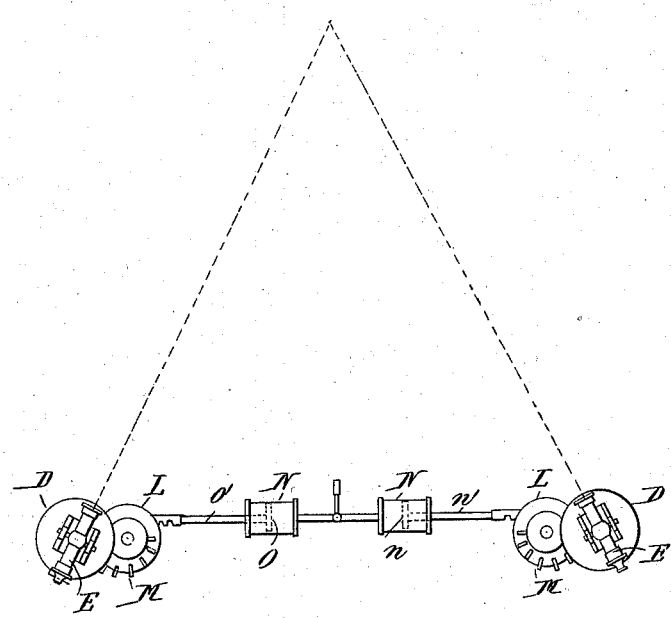
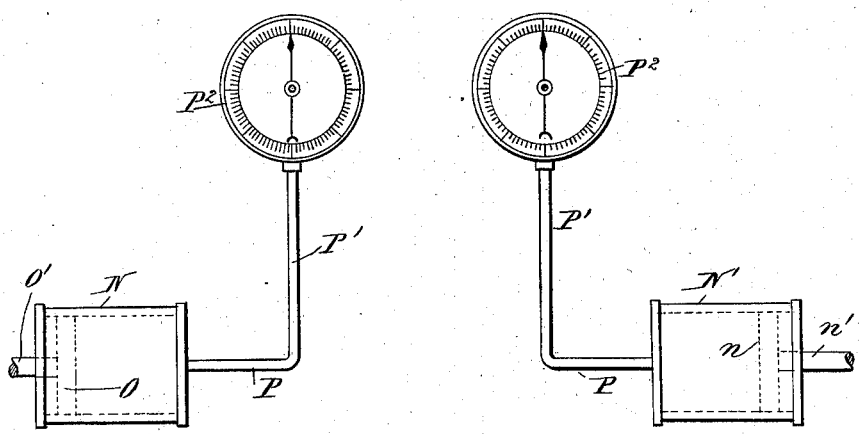
WITNESSES:
INVENTOR
ATTORNEYS.

UNITED STATES PATENT OFFICE.

ORO A. BELL, OF NEW YORK, N. Y.

METHOD OF AND APPARATUS FOR DETERMINING RANGES AND DISTANCES.

SPECIFICATION forming part of Letters Patent No. 558,926, dated April 28, 1896.

Application filed September 18, 1895. Serial No. 562,821. (No model.)

*To all whom it may concern:*

Be it known that I, ORO A. BELL, a citizen of the United States, and a resident of New York, in the county of New York and State of New York, have invented a certain new and useful Method of and Apparatus for Determining Ranges and Distances, of which the following is a specification, reference being had to the accompanying drawings, forming a part thereof, in which similar letters of reference indicate corresponding parts.

This invention relates to the method of and apparatus for finding the distance from a fixed given point to either a stationary or moving object, and for determining the change in position of such object; and the invention comprises a novel method of and apparatus for determining ranges and distances by means of fluids or gases under pressure; and with this and other objects in view the invention consists in the construction, combination, and arrangement of parts and in the method of the operation thereof, as hereinafter described.

The invention is fully disclosed in the following specification, of which the accompanying drawings form a part, in which—

Figure 1 is a view in elevation, showing the construction and arrangement of my improved apparatus; Fig. 2, a plan view showing the method of operation, and Fig. 3 represents a modification of a detail of construction.

My improved apparatus for determining ranges, distances, &c., is particularly adapted for use in determining the range, location, or distance of an object at sea, and it may be used from a fixed point upon the land or from a vessel, although, as will hereinafter appear, said apparatus may be used for other purposes, such as for finding a range, location, or distance of an object upon the land.

In the practice of my invention it is necessary to select or fix a base-line and to predetermine thereon two fixed points, and in the accompanying drawings A represents such a base-line, and B B the fixed points thereon. Arranged at each of these points is a vertical standard or support C, which carries at its top a plate or table D, which is preferably circular in form, and mounted on each of these tables is a field or other glass E, of any preferred form and construction, said glass being supported by a frame F, which is revolubly mounted, and from the center of each of which depends a shaft G. Mounted on each of the shafts G is a conical gear-wheel H, the base of which is directed upward, and arranged adjacent to the shafts G are vertical shafts K, on each of which is mounted a conical gear L, the base of which is directed downward, and each of the conical gears L is provided with a row of points or projections M, which are arranged in the form of a spiral thereon, which extends around the gear from the bottom to the top thereof, and which are adapted to engage with the conical gears H, as will be readily understood, and by means of these gears L the shafts K are revolved.

Arranged at predetermined distances between the shafts K and in line therewith are cylinders N and N', and within the cylinder N' is a piston $n$, (shown in dotted lines,) provided with a shaft $n'$, having at its outer end a rack-bar $n^2$, adapted to engage with a pinion $n^3$ on one of the vertical shafts K, and within the cylinder N is a piston O, provided with a shaft O', having formed at its outer end a rack-bar $O^2$, adapted to engage with the pinion $O^3$ on the adjacent shaft K.

The adjacent ends of the cylinders N and N', which are arranged in line, and in line with the shafts K, are connected by means of a pipe P, with which communicates, preferably at or near the middle thereof, a vertical pipe P', at the upper end of which is formed a scale $P^2$, similar to that formed on measuring devices of this class, and said upper end is provided with a glass tube $P^3$ adjacent to said scale.

In operation the cylinders N and N' are filled or partially filled with any desired fluids or gases, and in order to find the range or distance of an object it is only necessary to turn the glasses E until each of them point directly at said object, when the distance will be determined on the scale $P^2$, if fluids be used, and, as will be understood, this scale may be so formed as to indicate distances from zero up to any required number of yards or rods.

In this operation the pistons O and $n$ are operated by means of the rack-bars $O^2$ and $n^2$, which are in operative connection with the pinions $O^3$ and $n^3$, and these in turn are operated by the gears L, which are operated by the gears H, connected with the shafts G, and the fluids or gases are caused to rise in the pipe P' by the movement of the pistons, as will be readily understood. The operation of these pistons depends to a large extent on the form of the gears L and H, the rapidity of the revolution of the pinions $O^3$ and $n^3$ depending upon the positions of the gears L, as will be readily understood, and the motion of these gears or the rapidity of their movement will depend entirely upon their positions, the spiral arrangement of the projections M serving to determine the speed of their revolution and the consequent movement of the pistons O and $n$. My invention is not limited to the form of gear for producing this result, and other arrangements and combinations may be substituted therefor; but this form of gear or another or others which will produce a similar result are necessary to the successful operation of the apparatus.

It will be observed that the movement of the pistons or the direction thereof will be controlled entirely by the direction of the revolution of the glasses E, and while one piston is forced forward or toward the pipe P the other may be withdrawn, or each of the pistons may be forced forward at the same time, or one of them forced forward and the other remaining stationary.

If gases be employed in the cylinder N and N', I prefer to use the form of scale or register shown in Fig. 3; but my invention is not limited to this construction, and in either event I also employ a pressure or regulator R, which consists of a side tube arranged on the tube P', through which passes a set-screw or other device R', and any desired form of regulator may be substituted for that shown and described.

I have also shown in Fig. 3 pipes P and P' and registers or recording devices $P^2$, connected with each of the pistons N and N', and in this form of apparatus the differential reading of the gages or registers will determine the distance of the object, and this form of construction may also be employed where fluids are used, as shown in Fig. 1, or, in other words, instead of using one measuring pipe and gage or register I may employ two, one being connected with each of the cylinders N and N'.

My invention is not limited to the exact form, construction, and arrangement of the various parts of the apparatus as herein shown and described, and I therefore reserve the right to make all such changes therein and modifications thereof as fairly come within the scope of the invention.

Having fully described my invention, I claim and desire to secure by Letters Patent—

1. In an apparatus for finding the location of an object, from a fixed point or points, the combination of standards arranged at predetermined points on a fixed line, a revoluble glass mounted at the top of each of said standards, and cylinders provided with pistons each of which is in operative connection with one of said glasses, said cylinders being in communication by means of a pipe with which is connected a scale-pipe and said cylinders being adapted to receive fluids or gases, substantially as shown and described.

2. In an apparatus for determining the distance of an object, from a fixed line, the combination of standards arranged at predetermined points on said line, a revoluble glass mounted on each of said standards, a shaft in connection with each of said glasses, said shafts being each in operative connection with the piston of a cylinder, and said cylinders being in communication by means of a pipe which communicates with a scale-pipe, said pistons being adapted to receive fluids or gases, substantially as shown and described.

3. In an apparatus for determining the location and distance of an object from a fixed line, the combination of vertical standards arranged at predetermined points on said line a revoluble glass mounted on each of said standards, a vertical shaft connected with each of said glasses, a supplemental vertical shaft arranged adjacent thereto, gears as H, and L, mounted on said shafts and by which the supplemental shaft is operated, cylinders arranged between said supplemental shafts, a piston arranged in each of said cylinders each of which is provided with a shaft at the end of which is a rack-bar adapted to engage with a pinion mounted on said supplemental shafts, said cylinders being also in communication by means of a pipe, which is in communication with a scale-pipe, substantially as shown and described.

4. The method of determining the range or distance of an object, from a fixed base-line, which consists in applying pressure to fluids or gases, confined in a measuring tube or vessel, substantially as shown and described.

5. The method herein described for determining the range and distance of an object, from a fixed base-line, which consists in applying pressure to fluids or gases confined in cylinders, and a measuring-tube, by means of operative devices connected with revoluble glasses mounted on standards or supports at predetermined points on said base-line, substantially as shown and described.

6. In an apparatus for finding the distance of an object from a fixed point or points the combination of standards arranged at predetermined points on a fixed line, a revoluble glass mounted upon each of said standards and cylinders adapted to contain fluids or gases and provided with pistons, each of said pistons being in operative connection with one of the said glasses and said cylinders being each connected with a pressure-recording gage, substantially as shown and described.

In testimony that I claim the foregoing as my invention I have signed my name, in presence of the subscribing witnesses, this 14th day of September, 1895.

ORO A. BELL.

Witnesses:
C. GERST,
K. ENSLIE.